United States Patent
Rong et al.

(10) Patent No.: US 10,066,766 B1
(45) Date of Patent: Sep. 4, 2018

(54) HOSE INNER LAYER FORMED OF ECO BLENDED WITH NBR/PVC

(71) Applicant: ContiTech USA, Inc., Fairlawn, OH (US)

(72) Inventors: Guangzhuo Rong, Hudson, OH (US); Thomas George Burrowes, North Canton, OH (US)

(73) Assignee: Contitech USA, Inc., Fairlawn, OH (US)

( * ) Notice: Subject to any disclaimer, the term of this patent is extended or adjusted under 35 U.S.C. 154(b) by 2 days.

(21) Appl. No.: 15/602,494

(22) Filed: May 23, 2017

(51) Int. Cl.
  *F16L 11/08* (2006.01)
  *C08L 63/00* (2006.01)
  *B67D 7/38* (2010.01)

(52) U.S. Cl.
  CPC ............. *F16L 11/086* (2013.01); *C08L 63/00* (2013.01); *B67D 7/38* (2013.01); *C08L 2205/03* (2013.01)

(58) Field of Classification Search
  CPC .............................. F16L 11/085; F16L 11/086
  USPC ........ 138/123–126, 137, 140, 141; 428/36.9, 428/36.91
  See application file for complete search history.

(56) References Cited

U.S. PATENT DOCUMENTS

| | | | |
|---|---|---|---|
| 4,510,974 A | 4/1985 | Natori et al. | |
| 4,604,155 A | 8/1986 | McKiernan | |
| 4,611,832 A * | 9/1986 | Matsuoka | F16L 11/045 118/DIG. 11 |
| 4,668,318 A | 5/1987 | Piccoli et al. | |
| 5,373,870 A | 12/1994 | Derroire et al. | |
| 5,639,528 A * | 6/1997 | Feit | B32B 1/08 428/36.91 |
| 5,919,326 A * | 7/1999 | Yokoe | B29C 47/0023 156/244.13 |
| 5,957,163 A * | 9/1999 | Ito | F16L 11/04 138/109 |
| 6,179,008 B1 | 1/2001 | Kawazura et al. | |
| 6,815,478 B2 * | 11/2004 | Tsujimura | C08K 3/34 524/280 |
| 6,923,218 B2 * | 8/2005 | Kumagai | B29C 66/7234 138/109 |
| 7,017,616 B2 | 3/2006 | Ono et al. | |
| 7,493,917 B2 * | 2/2009 | Hirai | F16L 11/081 138/126 |
| 8,714,203 B2 * | 5/2014 | Theis | B29C 47/023 138/124 |
| 9,346,662 B2 | 5/2016 | Van Vliet et al. | |
| 2007/0227607 A1 * | 10/2007 | Sakazaki | B32B 1/08 138/126 |

(Continued)

*Primary Examiner* — Patrick F Brinson
(74) *Attorney, Agent, or Firm* — David L. Cate

(57) ABSTRACT

A hose includes an inner tube containing an alloy of NBR/PVC mixed with ECO, and the inner tube has a tube wall thickness of from 2 mm to 4 mm. A first reinforcement layer surrounds the inner tube, and includes a first yarn layer spiral wound over the inner tube in a first winding direction, as well as a second yarn layer spiral wound over the first yarn layer in a second winding direction opposite the first winding direction. A friction layer is disposed over the first reinforcement layer. A second reinforcement layer surrounds the friction layer, and includes a third yarn layer spiral wound over the friction layer in a third winding direction, and a fourth yarn layer spiral wound over the third yarn layer in a fourth winding direction opposite the third winding direction. A cover layer is disposed over the second reinforcement layer.

27 Claims, 2 Drawing Sheets

(56) References Cited

U.S. PATENT DOCUMENTS

| | | |
|---|---|---|
| 2007/0248779 A1 | 10/2007 | Iio et al. |
| 2008/0241449 A1* | 10/2008 | Fukaya ............... B32B 1/08 428/36.8 |
| 2010/0104789 A1 | 4/2010 | Imada et al. |
| 2011/0226375 A1* | 9/2011 | Harris ............... B32B 1/08 138/137 |
| 2012/0090720 A1* | 4/2012 | Burrowes ........... B32B 1/08 138/124 |
| 2012/0199238 A1 | 8/2012 | Tamura et al. |
| 2014/0230947 A1 | 8/2014 | Zandiyeh |

* cited by examiner

HOSE INNER LAYER FORMED OF ECO BLENDED WITH NBR/PVC

FIELD

The field to which the disclosure generally relates is fuel hoses for transport of fluids such as CNG (compressed natural gas), LNG (liquefied natural gas) or LPG (liquefied petroleum gas).

BACKGROUND

This section provides background information to facilitate a better understanding of the various aspects of the disclosure. It should be understood that the statements in this section of this document are to be read in this light, and not as admissions of prior art.

Natural gas fueled well operation technology has gained wide acceptance in the industry. Moreover, certain leaders in the industry have further designed, built and commissioned natural gas mobile facilities, including mobile storage and vaporization trailers and pipeline components, to provide the natural gas fuel to the natural gas fueled engines, on site. In this manner, it is now accepted practice to run well operation equipment, including fracturing and drilling equipment, on natural gas, and to thereby realize a significant savings in fuel cost, over the former practice of using diesel fuel while also reducing NOx and particulate emissions.

Equipment at a well being fractured requires large amounts of fuel. Conventionally, if the equipment needs to be at the well site during a very large fracturing job, the fuel tanks of the equipment may need to be filled up several times, and this is done by the well known method of manually discharging fluid from a fuel source into each fuel tank one after the other. If one of the fuel tanks runs out of fuel during the fracturing job, the fracturing job may need to be repeated, or possibly the well may be damaged. The larger the fracturing job, the more likely equipment is to run out of fuel. Dangers to the existing way of proceeding include: extreme operating temperatures and pressures, extreme noise levels, and fire hazard from fuel and fuel vapors.

Polymer hosing is used to connect the natural gas fueled engines and the natural gas mobile storage and vaporization equipment. The presently accepted practice, in the industry, is to assemble and run a 7.62 cm diameter poly hose structure from the natural gas mobile storage and vaporization equipment supply trailer to well operation equipment. However, at extremely low temperatures such as −20 deg C. or lower, conventional polymer hosing is prone to ultimately crack and fail given the conditions they are exposed to.

Epichlorohydrin rubber (ECO) has very low glass transition temperature (Tg), excellent fuel permeation resistance and a saturated polymer backbone, and has such, it has been used in fuel hoses for low temperature resistance, fuel permeation resistance and ozone resistance especially in "dry out" applications where limited amount of plasticizer is allowed in the formulation. In dry out applications, the fuel will be "dried out" from hoses after each service use, which makes hose tube exposed prone to ozone attack. Plasticizers will also be extracted out by fuels after a short period of time, which also, decreases low temperature flexibility.

However, ECO, used alone, does not have sufficient 'green strength' during hose manufacture. Green strength is required for non-mandrel extrusion processes, especially for large diameter hoses. NBR/PVC alloy has also been used in fuel hose for low temperature resistant, fuel permeation resistant fuel and ozone resistance, but it cannot achieve both acceptable low temperature resistance and good fuel permeation resistance, especially in the "dry out" applications.

Hence, it is desirable to have hoses for transferring fluids, which have sufficient properties, "dry out" application capability, flexibility, and long term durability under extremely low temperature conductions, such need met, at least in part, with embodiments according to this disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a hose includes an inner tube formed of an alloy of NBR/PVC mixed with ECO, the inner tube having a tube wall thickness of from about 2 mm to about 4 mm, and the NBR/PVC and ECO are mixed at a ratio of from about 1:2 by weight to about 2:1 by weight. A reinforcement layer surrounds the inner tube, and the reinforcement layer may have a first yarn layer spiral wound over the inner tube in a first winding direction, and a second yarn layer spiral wound over the first yarn layer in a second winding direction opposite the first winding direction. A cover layer is disposed over the reinforcement layer. The hose may have a burst pressure of up to about 3500 psi at a temperature of about −40 deg C. In some cases, the NBR/PVC and the ECO are mixed at a ratio of 1:1 by weight. Also, the cover may include an alloy of NBR/PVC. The first yarn layer and the second yarn layer may each contain aramid yarn.

In another aspect of the disclosure, a hose includes an inner tube containing an alloy of NBR/PVC mixed with ECO, and the inner tube has a tube wall thickness of from about 2 mm to about 4 mm. A first reinforcement layer surrounds the inner tube, and includes a first yarn layer spiral wound over the inner tube in a first winding direction, as well as a second yarn layer spiral wound over the first yarn layer in a second winding direction opposite the first winding direction. A friction layer is disposed over the first reinforcement layer. A second reinforcement layer surrounds the friction layer, and includes a third yarn layer spiral wound over the friction layer in a third winding direction, and a fourth yarn layer spiral wound over the third yarn layer in a fourth winding direction opposite the third winding direction. A cover layer is disposed over the second reinforcement layer. In some cases, a ply reinforcement layer is disposed between the inner tube and the first reinforcement layer, and may contain aramid yarns. The hose may have a burst pressure of up to about 3500 psi at a temperature of about −40 deg C.

The NBR/PVC and the ECO may be mixed at a ratio of from about 1:2 by weight to about 2:1 by weight, or even a ratio of 1:1 by weight. The cover layer may include an alloy of NBR/PVC, and the friction layer may be based upon NBR. In some cases, the first yarn layer, the second yarn layer, the third yarn layer and the fourth yarn layer each contain aramid yarn.

In yet another aspect of the disclosure, a fuel transfer hose includes an inner tube containing an alloy of NBR/PVC mixed with ECO, the inner tube having a tube wall thickness of from 2 mm to 4 mm, and the NBR/PVC and ECO are mixed at a ratio of from about 1:3 by weight to about 3:1 by weight, or even about 1:1 by weight. A first reinforcement layer surrounds the inner tube, and a friction layer is disposed over the first reinforcement layer. A second reinforcement layer surrounds the friction layer, and a cover layer is disposed over the second reinforcement layer. The fuel transfer hose has a burst pressure of up to about 3500 psi at a temperature of about −40 deg C. The fuel transfer hose may also have a ply reinforcement layer disposed between the inner tube and the first reinforcement layer.

In some cases, the first reinforcement layer of the fuel transfer hose has a first yarn layer spiral wound over the inner tube in a first winding direction, and a second yarn layer spiral wound over the first yarn layer in a second winding direction opposite the first winding direction. Also, the second reinforcement layer of the fuel transfer hose may have a third yarn layer spiral wound over the friction layer in a third winding direction, and a fourth yarn layer spiral wound over the third yarn layer in a fourth winding direction opposite the third winding direction.

In some aspects the inner tube defines a conduit and the conduit contains compressed natural gas, and/or liquefied natural gas. In an application, the hose is connected to a fuel delivery system, such as a fuel delivery system at a well site.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
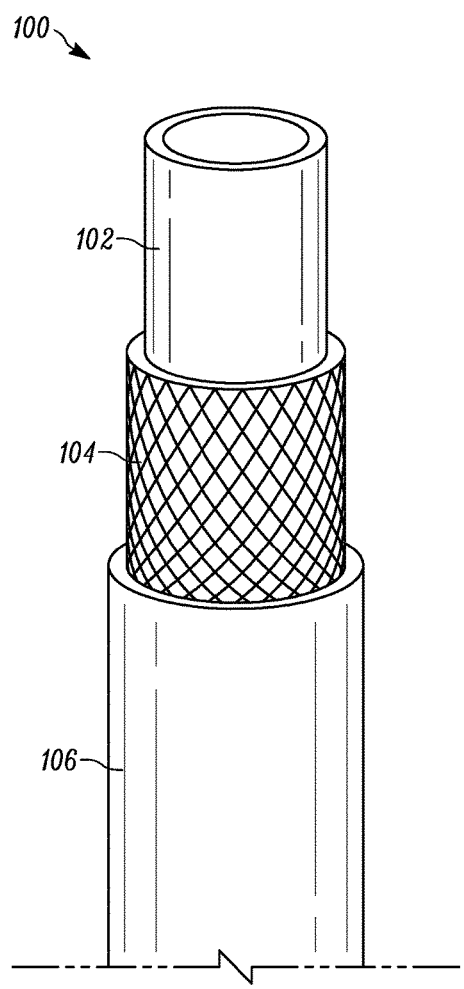
FIG. 1 illustrates in perspective view, a hose according to some aspects of the disclosure; and, FIG. 2 depicts in perspective view, another hose according to some aspects of the disclosure.

Some hose embodiments according to the disclosure have the structure shown in FIG. 1. The hose 100 is composed of at least an inner tube 102, reinforcing layer 104, and outer cover 106. The inner tube 102 is formed from the elastomer composition according to the disclosure. So long as it is in the range where the properties of the hoses of the disclosure are not impaired, a composition other than the elastomer composition of the present disclosure may also be used for the outer cover 106.

By using the elastomer composition of the disclosure in this way for the inner tube, hoses having the desired performance can be obtained. When using such elastomer composition for the inner tube, the composition constituting the other tube is not particularly limited so long as it has flexibility and cold temperature characteristics of an extent which does not impair the properties of the hose of the present invention.

Elastomer compositions composed in inner tube 102 include an alloy of acrylonitrile butadiene and polyvinyl chloride rubber (NBR/PVC) mixed with epichlorohydrin rubber (referred to generally as 'ECO'). NBR/PVC alloy generally has good green strength (hose processing strength prior to vulcanization) due to the presence of PVC. The addition of NBR/PVC alloy greatly improves the green strength of ECO compound, to such extend that it can be used in non-mandrel hose manufacturing process with sufficient green strength from about 20 deg C. to about 140 deg C. While any suitable weight ratio of NBR/PVC alloy and ECO may be used, in some aspects, the weight ratio is from about 1:3 to about 3:1, from about 1:2 to about 2:1, or even about 1:1.

Some suitable epichlorohydrin rubbers which are used in accordance with the disclosure include epichlorohydrin homopolymer, epichlorohydrin/ethylene oxide copolymer, and epichlorohydrin terpolymer. These types of epichlorohydrin rubbers are formed from epichlorohydrin, ethylene oxide and allyl glycidyl ether. Such materials are commercially available, and may be sourced from Zeon Chemicals L.P. under the trade names H-SERIES—Hydrin®, C-SERIES Hydrin® and T-SERIES Hydrin®. Some properties of epichlorohydrin rubbers include good resistance to oils, fuels and chemicals, high cold and heat resistance, good weather, ozone and thermal resistance, good processability, and low gas permeability.

Alloys of acrylonitrile butadiene and polyvinyl chloride rubber (NBR/PVC) used according to the disclosure may be blended in a weight ratio of from about 70/30 NBR/PVC to about 50/50 NBR/PVC. The acrylonitrile butadiene generally has a low acrylonitrile content, such as from about 18% to 30% by weight, about 20% to 27% by weight, or even about 22% to 25% by weight. In some embodiments, the acrylonitrile content of the acrylonitrile butadiene rubber is about 23% by weight. In some aspects, the alloys of acrylonitrile butadiene/polyvinyl chloride rubber and epichlorohydrin rubbers have similar Mooney viscosity properties to enable suitable mixing of the compositions for processing. Also, the compositions may further include a plasticizer in low amounts, such as less than 10 phr, to improve processing. A high level of plasticizer in the tube compound is to be avoided as it would be extracted out by the fuel and therefore be detrimental to property retention after service.

The reinforcing layer 104 constituting the hose 100 is not particularly limited, but like the reinforcing layer of a conventional hose may be one or more layers of a yarn produced from a vinylon fiber, rayon fiber, polyester fiber, nylon fiber, aromatic polyamide fiber, etc. or a metal wire or metal alloy wire etc. braided, wrapped in a spiral, or wrapped in a plurality of spiraled layers wound in counter directions.

Further, in the production of some hoses according to the disclosure, it is possible to produce the inner tube 102 by known extrusion processes, provide an optional bonding layer or reinforcement on its outer surface if necessary, braid/spiral the reinforcing layer 104 over the same, and cover the same with the outer cover 106 by extrusion so as to bond the layers of the hose integrally. The hoses may then be cured or otherwise vulcanized.

Figure 2:
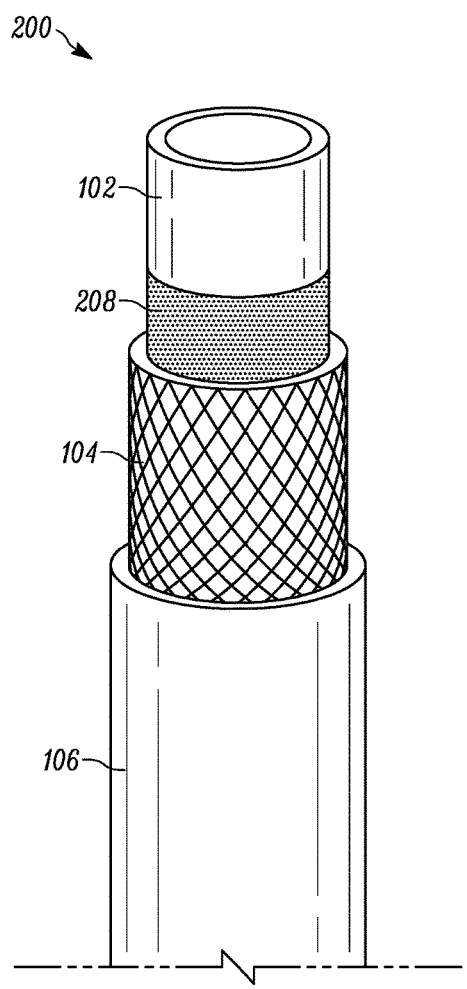

In another aspect of the disclosure, some hose embodiments have the structure shown in FIG. 2. The hose 200 includes an inner tube 102, reinforcing layer 104, outer cover 106, similar to hose 100 described above, and further includes a ply reinforcement layer 208 disposed between inner tube 102 and reinforcing layer 104. The ply reinforcement layer 208 is not particularly limited, but may be produced from a vinylon fiber, rayon fiber, polyester fiber, nylon fiber, or aromatic polyamide fiber, etc. in a ply configuration.

Figure 3:
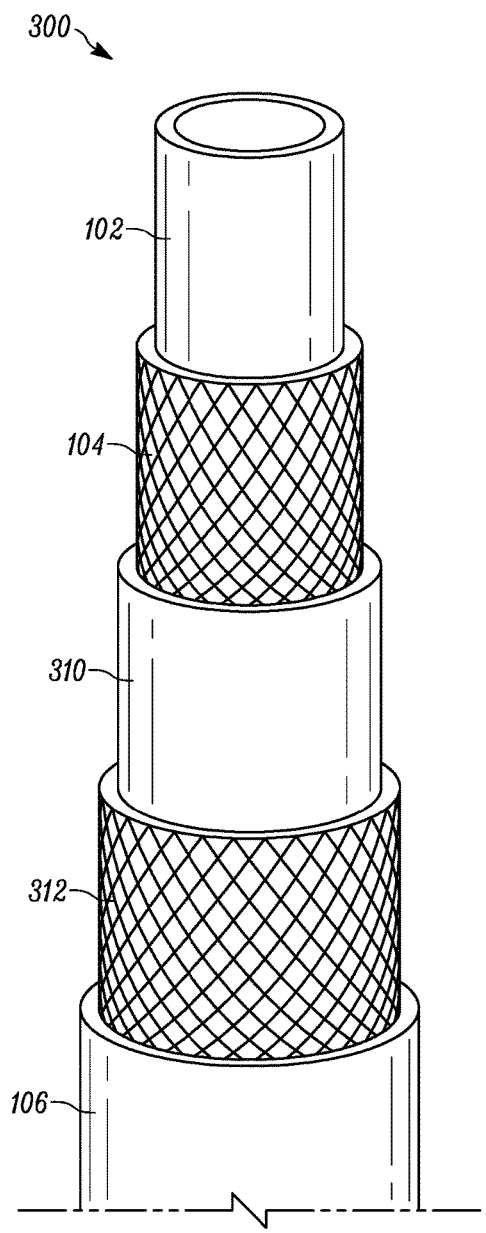
FIG. 3 illustrates in perspective view, yet another hose according to some aspects of the disclosure; and, FIG. 4 depicts in perspective view, another hose according to some aspects of the disclosure.

In yet another aspect of the disclosure, some hose embodiments have the structure shown in FIG. 3. The hose 300 includes an inner tube 102, reinforcing layer 104, friction layer 310, second reinforcing layer 312, and outer cover 106. The second reinforcing layer 312, is not particularly limited, but may be produced from a vinylon fiber, rayon fiber, polyester fiber, nylon fiber, aromatic polyamide fiber, etc. or a hard steel wire etc. braided, wrapped in a spiral, or wrapped in a plurality of spiraled layers wound in counter directions.

Figure 4:
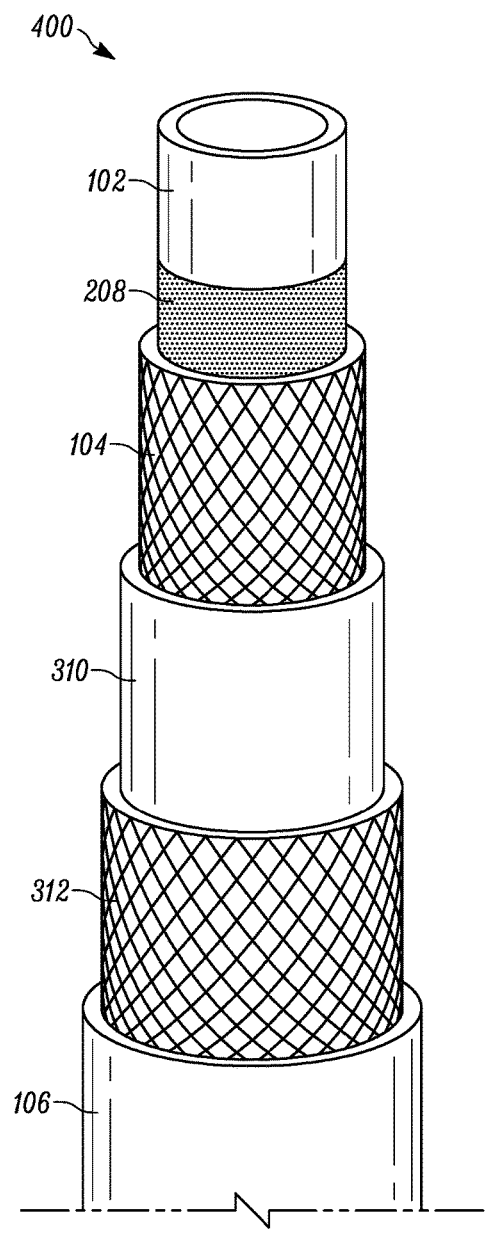

In some another aspects of the disclosure, hose embodiments have the structure shown in FIG. 4. Hose 400 includes an inner tube 102, reinforcing layer 104, friction layer 310, second reinforcing layer 312, and outer cover 106. The hose further includes a ply reinforcement layer 208 disposed between inner tube 102 and reinforcing layer 104.

With regards to the reinforcing layers 104, friction layers 310, second reinforcing layers 312, outer covers 106, and ply reinforcement layers depicted above, such may be formed from any suitable materials know to those of skill in the art. In some aspects, such layers may be formed from those materials disclosed in U.S. Pat. No. 6,179,008 B1, which is incorporated herein by reference thereto.

As described above, each of the reinforcing layers may be formed by spiral winding one or more layers of a yarn or hard steel wire. In those cases where two layers of a yarn, metal wire, or metal alloy wire are used, a first layer may be spiral wound in a first winding direction, and a second layer spiral wound in a second winding direction opposite the first winding direction. In some cases, the first layer is laid at a positive angle relative to the longitudinal axis of the hose, and the second layer laid at a negative angle relative to the longitudinal axis. The angle of one of layers may be between about 45° and 65°, and the angle of the other layers between about −45° and −65°.

The friction layer used in embodiments according to the disclosure is typically from about 0.020 inches (0.5 mm) to about 0.051 inches (1.3 mm) thick, is more typically from about 0.024 inches (0.6 mm) to about 0.0.43 inches (1.1 mm) thick, and in some aspects, will be from about 0.028 inches (0.7 mm) to about 0.035 inches (0.9 mm) in thickness. The friction layer may be formed from any suitable curable rubber based composition, containing such rubber as acrylonitrile butadiene rubber (NBR), hydrogenated NBR, cross-linked NBR (XNBR), fluoroelastomer, epichlorohydrin, nitrile, carboxylated nitrile rubber, or blends thereof.

The curable rubber employed in the friction layer of hoses in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents, talc and fillers, such as carbon black, silica, other mineral fillers, lignin, and the like. Reinforcing fillers are typically utilized at a level which is within the range of about 50 parts per hundred parts of resin (phr) to about 150 phr. In some embodiments, talc is incorporated in an amount of from about 10 phr to about 60 phr, and such may be included in compositions useful in any layers of the hoses.

The cover layer in embodiments according to the disclosure, has a thickness of from about 0.039 inches (1 mm) to about 0.12 inches (3 mm), from about 0.059 inches (1.5 mm) to about 0.098 inches (2.5 mm), and in some instances, about 0.067 inches (1.7 mm) to about 0.075 inches (1.9 mm). In some aspects, the cover layer can be a curable rubber composition containing one or more suitable rubbers, such as polychloroprene, NBR/PVC rubber blend, NBR, epichlorohydrin rubber, chlorosulfonated polyethylene, hydrogenated NBR, fluoroelastomer, styrene-butadiene rubber, chlorinated polyethylene or blends thereof. Any of the materials forming the cover layer may be further loaded with metal particles, carbon black, or another electrically-conductive particulate, flake, or fiber filler so as to render the hose electrically-conductive for static dissipation or other applications. The compositions forming the cover layer also include such additives as retardants to prevent an unduly quick cure, antioxidants, adhesion promoters, processing aids, reinforcing agents and fillers, such as carbon black, silica, other mineral fillers, lignin, and the like.

As described above, the inner tube is based upon a composition including an alloy of acrylonitrile butadiene and polyvinyl chloride rubber (NBR/PVC) mixed with epichlorohydrin rubber (ECO). Any suitable amount of these materials may be used. Additional fillers and additives may be included in the formulation of the composition depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives.

The thickness of the inner tube in embodiments according to the disclosure, may be from about 0.089 inches (2 mm) to about 0.157 inches (4 mm), from about 0.098 inches (2.5 mm) to about 0.138 inches (3.5 mm), and in some instances, about 0.106 inches (2.7 mm) to about 0.130 inches (3.3 mm).

EXAMPLES

The following experimental data was generated for the purpose of further illustrating the nature of some of the embodiments and aspects of the disclosure, and are not intended as a limitation on the scope thereof. The following examples were prepared to illustrate improved inner tube properties for manufacturing and high performance hoses, in accordance with some aspects of the disclosure.

In the following examples, in a first pass, a non-productive blend of components was mixed in an internal mixer as indicated in table 1. The non-productive batch was dropped at a temperature of from about 100 deg C. to 120 deg C. Thereafter, in a second pass, additional components were added to non-productive blend to form a product blend by mixing in an internal mixer. The productive batch was dropped to a temperature of from about 100 deg C. to about 110 deg C. Ingredients used for these examples, ex. 1 through ex. 6, are provided in table 1. Thereafter are provided descriptions/availability of ingredients used in the compounding of the non-productive and productive blends.

The productive blends were then formed into 2 mm thick sheets, and either tested in 'green' form, uncured form, for green strength, or cured at temperature of about 160 deg C. for 30 minutes. Physical property testing was conducted on the cured example sheets or uncured examples, with values indicated in tables 2 and 3 below. Any evaluation conducted "with the grain" means the evaluation was carried out with stress or forces applied in a direction parallel with the orientation of the plurality of rod shaped particles. The evaluations for tensile (psi), elongation %, Mod 20 (psi), Mod 50 (psi) and Mod 100 (psi) were conducted according to ASTM D412. Shore A was conducted according to ASTM D2240, and Volume swell % according to ASTM D471. Hexane Permeation test was conducted by an in-house jar test. A cured, 2 mm thick sheet was placed upon jar opening and tightly sealed by jar lid without any leakage of hexane. The permeation rate was measured by weight loss per square meter per day. For Static Ozone tests, samples were immersed in hexane for 24 hours to extract all plasticizers before being mounted in fixtures at 25% strain; the fixtures with stretched samples were dried 24 hours at room temperature in ventilated hood, and then held another 24 hours at 40 deg C. in an oven before placing in ozone chamber for testing.

TABLE 1

| Ingredient | Ex. 1 | Ex. 2 | Ex. 3 | Ex. 4 | Ex. 5 | Ex. 6 |
|---|---|---|---|---|---|---|
| | non-productive blend | | | | | |
| ECO[1] | 70 | 70 | 60 | 60 | 60 | 60 |
| NBR/PVC Alloy[2] | 43 | 43 | 57 | 57 | 57 | 57 |
| N330 carbon black | 50 | 40 | 50 | 50 | 40 | 40 |
| Talc | 40 | 40 | 40 | 20 | 20 | 40 |
| Glycol ether adipate plasticizer[3] | 5 | 5 | 5 | 8 | 5 | 5 |
| Zinc oxide | 5 | 5 | 5 | 5 | 5 | 5 |
| Stearic acid | 1 | 1 | 1 | 1 | 1 | 1 |
| Processing aid[4] | 0.5 | 0.5 | 0.5 | 0.5 | 0.5 | 0.5 |
| Antioxidant-1[5] | 0.5 | 0.5 | 0.5 | 0.5 | 0.5 | 0.5 |
| Antioxidant-2[6] | 1.5 | 1.5 | 1.5 | 1.5 | 1.5 | 1.5 |
| Paraffinic wax | | | | 1 | 1 | 1 |
| Microcrystalline wax | | | | 1 | 1 | 1 |
| Antioxidant-3[7] | | | | 1 | 1 | 1 |
| Antioxidant-4[8] | | | | 1 | 1 | 1 |
| | productive blend | | | | | |
| Sulfur | 1 | 1 | 1 | | | |
| MC-98 Sulfur[9] | | | | 1.25 | 1 | 1 |
| TBBS[10] | 2 | 2 | 2 | 1.5 | 2 | 2 |
| TBzTD[11] | 0.5 | 0.5 | 0.5 | 0 | 0.5 | 0.5 |
| PVI[12] | 0.2 | 0.2 | 0.2 | 0.2 | 0.2 | 0.2 |
| PHR Running Total: | 220.2 | 210.2 | 224.2 | 210.45 | 198.2 | 218.2 |

[1]Hydrin ® T3108 available from Zeon Chemicals L.P.
[2]Nipol ® Sivic Z702 available from Zeon Chemicals L.P.
[3]Plasthall ® 226 available from Hallstar Corp.
[4]STRUKTOL ® TR 121
[5]VANOX ® MTI available from Vanderbilt Chemicals, LLC.
[6]Oxoflex ® DPA available from Sovereign Chemical Co.
[7]Polystay 100 available from Goodyear Tire & Rubber Co.
[8]Santoflex ™ 6PPD available from Eastman Chemical Co.
[9]MC-98 sulfur available from Akrochem Corp.
[10]N-tert-butyl-benzothiazole sulfenamide
[11]Tetrabenzylthiuram disulfide
[12]N-(cyclohexylthio) phthalimide

TABLE 2

| Test | Ex. 1 | Ex. 2 | Ex. 3 | Ex. 4 | Ex. 5 | Ex. 6 |
|---|---|---|---|---|---|---|
| Mooney Viscosity (212 F) | | | | | | |
| ML(1 + 4) | 93.26 | 75.9 | 101.55 | 76.11 | 67.86 | 74.77 |
| Uncured Rubber Green Strength | | | | | | |
| Tensile, psi | 218 | 170 | 310 | 204 | 170 | 211 |
| Elongation, % | 87 | 102 | 96 | 135 | 160 | 112 |
| Shore A Hardness | 55 | 47 | 57 | 55 | 46 | 55 |
| Mod 20, psi | 174 | 129 | 212 | 150 | 125 | 157 |
| Mod 50, psi | 204 | 152 | 267 | 170 | 133 | 180 |
| Mod 100, psi | 217 | 170 | 310 | 199 | 158 | 208 |
| Original Physical Properties | | | | | | |

TABLE 2-continued

| Test | Ex. 1 | Ex. 2 | Ex. 3 | Ex. 4 | Ex. 5 | Ex. 6 |
|---|---|---|---|---|---|---|
| Tensile, psi | 1815 | 1542 | 1763 | 1826 | 1557 | 1595 |
| Elongation, % | 266 | 252 | 173 | 322 | 287 | 259 |
| Mod 100, psi | 1113 | 922 | 1324 | 794 | 750 | 913 |
| Shore A Hardness | 79 | 74 | 81 | 75 | 72 | 75 |
| Air Oven Age (70 h/212 F) | | | | | | |
| Tensile retention, % | 118 | 136 | 128 | 112 | 125 | 119 |
| Elongation retention, % | 71 | 86 | 97 | 74 | 86 | 92 |
| Fluid Immersion (70 h/72 F/Hexane) | | | | | | |
| Tensile retention, % | 85 | 94 | 76 | 81 | 84 | 76 |
| Elongation retention, % | 81 | 106 | 79 | 82 | 79 | 74 |
| Vol Swell % | 6.91 | 7.18 | 8.51 | 8.83 | 8.53 | 8.23 |
| Static ozone* (50 pphm/25% strain/104 F/168 hours) | | | | No crack | | |
| Hexane Permeation (72 F) | | | | | | |
| Permeation rate, g/m2/day | | 9 | | 15 | | 11 |

The above test results show the advantages of using ECO blended with NBR/PVC for use as inner tube compositions. Suitable green strength for non-mandrel extrusion process, good chemical permeation resistance, suitable low temperature resistance, and good ozone resistance were demonstrated. Furthermore, the use of a relatively low level of plasticizer provides "dry out" resistance to avoid loss of flexibility. Also, a benefit utilizing a non-mandrel hose manufacturing process enable lower cost and resource consumption.

The composition evaluated in Ex. 4 was used to prepare two test hose, as described in detail below. The blend of ECO and NBR/PVC alloy used to prepare the inner tube of these hoses had good low temperature resistance down to −40 deg C., good fuel permeation resistance, good ozone resistance. and a Tg of −52 deg C. from a DMA G' temperature sweep test.

A first test hose was prepared in an extrusion/spinning process, and included an inner tube formed of the composition of Ex. 4, as the inner most layer. A ply layer using Twaron® aramid yarn (1500/1) was applied over the green inner tube, and first layer Technora® (1500/3) aramid yarn (1500/3) was spiral wound over the ply layer in a first winding direction. A second layer of Technora® aramid yarn (1500/3) was spiral wound over the first layer Technora® aramid yarn in a second winding direction opposite the first winding direction. A friction layer of acrylonitrile butadiene rubber was applied over the second layer of Technora® aramid yarn. A third layer Technora® aramid yarn (1500/3) was spiral wound over the friction layer in a third winding direction, and a fourth layer of Technora® aramid yarn (1500/3) was spiral wound over the third layer Technora® aramid yarn in a fourth winding direction opposite the third winding direction. Then a cover layer of acrylonitrile butadiene/polyvinyl chloride rubber blend was applied over the fourth layer of Technora® aramid yarn. The hose was then vulcanized, at a temperature of about 160 deg C.

This first hose had an inner diameter of about 25.6 mm, and an outer diameter of about 37.8 mm. The inner tube hand a thickness of about 2.8 mm, the friction layer had a thickness of about 0.8 mm, and the cover layer had a thickness of about 1.9 mm. The overall hose thickness was about 5.7 mm. The hose was pressure tested, and successfully passed a 1750 psi burst pressure test.

A second test hose was prepared in an extrusion/spinning process as well, and also included an inner tube formed of the composition of Ex. 4, as the inner most layer. A ply layer using Twaron® aramid yarn (1500/1) was applied over the green inner tube, and first layer Technora® (1500/3) aramid yarn (1500/3) was spiral wound over the ply layer in a first winding direction. A second layer of Technora® aramid yarn (1500/3) was spiral wound over the first layer Technora® aramid yarn in a second winding direction opposite the first winding direction. A friction layer of acrylonitrile butadiene rubber was applied over the second layer of Technora® aramid yarn. A third layer Technora® aramid yarn (1500/3) was spiral wound over the friction layer in a third winding direction, and a fourth layer of Technora® aramid yarn (1500/3) was spiral wound over the third layer Technora® aramid yarn in a fourth winding direction opposite the third winding direction. Then a cover layer of acrylonitrile butadiene/polyvinyl chloride rubber blend was applied over the fourth layer of Technora® aramid yarn. The hose was then vulcanized, at a temperature of about 160 deg C.

The second hose had an inner diameter of about 38.1 mm, and an outer diameter of about 5.18 mm. The inner tube hand a thickness of about 3.2 mm, the friction layer had a thickness of about 0.8 mm, and the cover layer had a thickness of about 1.9 mm. The overall hose thickness was about 6.3 mm. The hose was pressure tested, and successfully passed a 1750 psi burst pressure test.

Hose according to the disclosure have a variety of fluid transfer applications at suitable pressures, including, but not limited to, equal or less than about 3500 psi in some cases, of even equal or less than about 3000 psi, in some other aspects. In some embodiments, the hoses of the disclosure are useful for transferring fuels, such as diesel fuel, gasoline, propane gas, natural gas, liquefied natural gas, compressed natural gas, liquefied petroleum gas, and the like. In one aspect, the hoses according to the disclosure are useful in fuel delivery systems, such as those described in U.S. Pat. No. 9,346,662 B2, which is incorporated herein by reference thereto.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising:
   an inner tube comprising an alloy of NBR/PVC mixed with ECO, wherein the inner tube has a tube wall thickness of from 2 mm to 4 mm, and wherein the NBR/PVC and ECO are mixed at a ratio of from 1:2 by weight to 2:1 by weight;
   a reinforcement layer surrounding the inner tube, wherein the reinforcement layer comprises a first yarn layer spiral wound over the inner tube in a first winding direction, and a second yarn layer spiral wound over the first yarn layer in a second winding direction opposite the first winding direction; and,
   a cover layer disposed over the reinforcement layer.

2. The hose according to claim 1, wherein the alloy of NBR/PVC and the ECO are mixed at a ratio of 1:1 by weight.

3. The hose according to claim 1, wherein the ECO is an epichlorohydrin terpolymer.

4. The hose according to claim 1, wherein the first yarn layer and the second yarn layer each comprise aramid yarn.

5. The hose according to claim 1, wherein the hose has a burst pressure of up to 3500 psi at a temperature of −40 deg C.

6. The hose according to claim 1, wherein the alloy of NBR/PVC and the ECO are curable with a sulfur cure system.

7. The hose according to claim 1, wherein NBR comprised in the alloy of NBR/PVC comprises acrylonitrile in an amount of from 18% to 30% by weight based upon total weight of the NBR.

8. The hose according to claim 1, wherein the inner tube further comprises talc in an amount 10 phr to 60 phr, preferably 20 phr.

9. The hose according to claim 1, wherein the inner tube further comprises a plasticizer in an amount of 10 phr or less.

10. A hose comprising:
    an inner tube comprising an alloy of NBR/PVC mixed with ECO, wherein the inner tube has a tube wall thickness of from 2 mm to 4 mm;
    a first reinforcement layer surrounding the inner tube, wherein the first reinforcement layer comprises a first yarn layer spiral wound over the inner tube in a first winding direction, and a second yarn layer spiral wound over the first yarn layer in a second winding direction opposite the first winding direction;
    a friction layer disposed over the first reinforcement layer;
    a second reinforcement layer surrounding the friction layer, wherein the second reinforcement layer comprises a third yarn layer spiral wound over the friction layer in a third winding direction, and a fourth yarn layer spiral wound over the third yarn layer in a fourth winding direction opposite the third winding direction; and,
    a cover layer disposed over the second reinforcement layer.

11. The hose according to claim 10 further comprising a ply reinforcement layer disposed between the inner tube and the first reinforcement layer.

12. The hose according to claim 10, wherein the ply reinforcement layer comprises aramid yarns.

13. The hose according to claim 10, wherein the NBR/PVC and the ECO are mixed at a ratio of from 1:2 by weight to 2:1 by weight.

14. The hose according to claim 10, wherein the NBR/PVC and the ECO are mixed at a ratio of 1:1 by weight.

15. The hose according to claim 10, wherein the cover layer comprises an alloy of NBR/PVC, and wherein the friction layer comprises NBR.

16. The hose according to claim 10, wherein the ECO is an epichlorohydrin terpolymer.

17. The hose according to claim 10, wherein the hose has a burst pressure of up to 3500 psi at a temperature of −40 deg C.

18. The hose according to claim 10, wherein the alloy of NBR/PVC and the ECO are curable with a sulfur cure system.

19. The hose according to claim 10, wherein NBR comprised in the alloy of NBR/PVC comprises acrylonitrile in an amount of from 18% to 30% by weight based upon total weight of the NBR.

20. The hose according to claim 10, wherein the inner tube further comprises a plasticizer in an amount of 10 phr or less.

21. A fuel transfer hose comprising:
    an inner tube comprising an alloy of NBR/PVC mixed with ECO, wherein the inner tube has a tube wall thickness of from 2 mm to 4 mm, and wherein the NBR/PVC and ECO are mixed at a ratio of from 1:3 by weight to 3:1 by weight;
    a first reinforcement layer surrounding the inner tube;
    a friction layer disposed over the first reinforcement layer;
    a second reinforcement layer surrounding the friction layer; and,
    a cover layer disposed over the second reinforcement layer;
    wherein the fuel transfer hose has a burst pressure of up to 3500 psi at a temperature of −40 deg C.

22. The fuel transfer hose according to claim 21:
    wherein the first reinforcement layer comprises a first yarn layer spiral wound over the inner tube in a first winding direction, and a second yarn layer spiral wound over the first yarn layer in a second winding direction opposite the first winding direction; and,
    wherein the second reinforcement layer comprises a third yarn layer spiral wound over the friction layer in a third winding direction, and a fourth yarn layer spiral wound over the third yarn layer in a fourth winding direction opposite the third winding direction.

23. The fuel transfer hose according to claim 21 further comprising a ply reinforcement layer disposed between the inner tube and the first reinforcement layer.

24. The fuel transfer hose according to claim 21, wherein the NBR/PVC and the ECO are mixed at a ratio of 1:1 by weight.

25. The fuel transfer hose according to claim 21, wherein the inner tube defines a conduit and the conduit contains compressed natural gas.

26. The fuel transfer hose according to claim 21, wherein the inner tube defines a conduit and the conduit contains liquefied natural gas.

27. The fuel transfer hose according to claim 21, wherein the hose is connected to a fuel delivery system.

* * * * *